US008120823B2

(12) United States Patent
Kuribayashi

(10) Patent No.: US 8,120,823 B2
(45) Date of Patent: Feb. 21, 2012

(54) OPTICAL BEAM SCANNING APPARATUS, IMAGE FORMING APPARATUS

(75) Inventor: Yasushi Kuribayashi, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/825,569

(22) Filed: Jun. 29, 2010

(65) Prior Publication Data

US 2010/0328731 A1 Dec. 30, 2010

Related U.S. Application Data

(63) Continuation of application No. 11/490,395, filed on Jul. 20, 2006, now Pat. No. 7,777,923.

(51) Int. Cl.
*H04N 1/04* (2006.01)

(52) U.S. Cl. ......... 358/484; 358/474; 358/1.7; 358/488; 347/259; 347/263; 399/220; 359/204.1

(58) Field of Classification Search .................. 358/474, 358/484, 1.7; 359/212.1, 208, 205.1, 204.1, 359/207, 212; 347/259, 263, 238, 115–118, 347/134; 399/220
See application file for complete search history.

(56) References Cited

U.S. PATENT DOCUMENTS

| | | | | |
|---|---|---|---|---|
| 5,786,594 A * | 7/1998 | Ito et al. | ......................... | 250/236 |
| 5,801,746 A * | 9/1998 | Yamaguchi et al. | .......... | 347/259 |
| 6,301,021 B1 * | 10/2001 | Ohnuma | ........................ | 358/475 |
| 6,549,227 B2 * | 4/2003 | Shiraishi et al. | ............... | 347/244 |
| 6,798,430 B2 | 9/2004 | Sato | | |
| 6,847,389 B2 * | 1/2005 | Shiraishi | ........................ | 347/134 |
| 6,862,119 B1 | 3/2005 | Yamamoto | | |
| 7,075,686 B2 | 7/2006 | Hayashi | | |
| 7,304,659 B2 * | 12/2007 | Shiraishi | ........................ | 347/238 |
| 7,391,542 B2 * | 6/2008 | Tanimura et al. | ............. | 358/481 |
| 7,515,162 B2 | 4/2009 | Horii | | |

(Continued)

FOREIGN PATENT DOCUMENTS

JP   62-269168   11/1987

(Continued)

OTHER PUBLICATIONS

Office Action for U.S. Appl. No. 11/490,395 mailed on Oct. 27, 2009.

*Primary Examiner* — Negussie Worku
(74) *Attorney, Agent, or Firm* — Turocy & Watson, LLP

(57) ABSTRACT

In an optical beam scanning apparatus and an image forming apparatus equipped with the optical beam scanning apparatus of the present invention, plural optical members that irradiate scanning lines by laser beams (beams) emitted from plural light sources individually onto corresponding photoconductive drums are disposed within an optical unit housing and a housing cover, a fixing mechanism configured to fix part of a parallel plate provided within the optical unit housing and the housing cover is provided, and a twist angle adjusting mechanism configured to adjust an angle of twist of the parallel plate by rotating, in a specific direction, the parallel plate having the part thereof being fixed with the fixing mechanism is provided. According to the optical beam scanning apparatus and the image forming apparatus equipped with the optical beam scanning apparatus of the present invention, it is possible to adjust the curve and the inclination of the scanning line with ease and at high accuracy.

18 Claims, 15 Drawing Sheets

[A]

[B]

U.S. PATENT DOCUMENTS

| | | | |
|---|---|---|---|
| 7,697,184 B2* | 4/2010 | Sakaue et al. | 359/212.1 |
| 7,777,923 B2* | 8/2010 | Kuribayashi | 358/484 |
| 7,956,884 B2* | 6/2011 | Ichii | 347/241 |
| 2003/0218029 A1* | 11/2003 | Brody | 222/402.15 |
| 2004/0057096 A1* | 3/2004 | Amada et al. | 359/204 |
| 2004/0239999 A1* | 12/2004 | Tanimura et al. | 358/474 |
| 2005/0062839 A1* | 3/2005 | Shiraishi | 347/238 |
| 2006/0209171 A1* | 9/2006 | Shiraishi | 347/259 |
| 2007/0029471 A1* | 2/2007 | Yamaguchi | 250/234 |
| 2007/0030497 A1* | 2/2007 | Yamaguchi | 358/1.7 |
| 2007/0053011 A1* | 3/2007 | Sobue | 358/474 |
| 2007/0064280 A1* | 3/2007 | Fang et al. | 358/474 |
| 2007/0146738 A1* | 6/2007 | Nakajima | 358/1.4 |
| 2007/0279707 A1* | 12/2007 | Yamaguchi | 358/484 |
| 2008/0030804 A1* | 2/2008 | Kuribayashi | 358/484 |

FOREIGN PATENT DOCUMENTS

| | | |
|---|---|---|
| JP | 2002-182145 | 6/2002 |
| JP | 2004-012596 | 1/2004 |
| JP | 2006-017881 | 1/2006 |

* cited by examiner

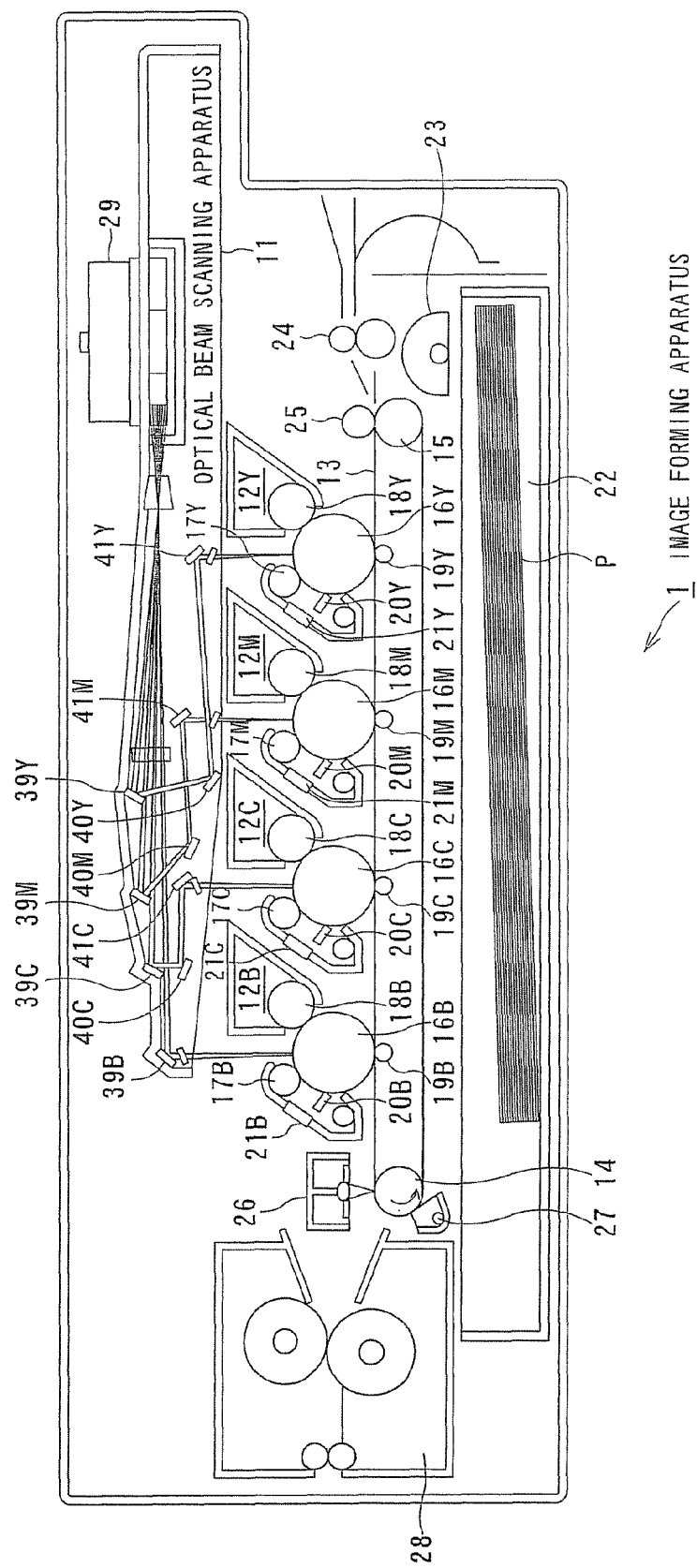
F I G. 2

[A]  [B]

[A]

[B]

OPTICAL BEAM SCANNING APPARATUS, IMAGE FORMING APPARATUS

CROSS-REFERENCE TO RELATED APPLICATIONS

This application is a Continuation of application Ser. No. 11/490,395 filed Jul. 20, 2006, the entire contents of which is incorporated herein by reference.

BACKGROUND OF THE INVENTION

1. Technical Field of the Invention

The present invention relates to an optical beam scanning apparatus and an image forming apparatus equipped with the optical beam scanning apparatus, and more particularly, to an optical beams scanning apparatus configured to be capable of adjusting the curve and the inclination of a scanning line for a latent image and an image forming apparatus equipped with the optical beam scanning apparatus.

2. Related Art

An image forming apparatus of the electrophotgraphic method, such as a laser printer, a digital copying machine, and a laser facsimile machine, is equipped with an optical beam scanning apparatus that forms an electrostatic latent image on the photoconductive drum by irradiating a laser beam (optical beam) on the surface of the photoconductive drum and scanning the laser beam thereon.

Recently, a method of increasing the number of laser beams scanned by a single optical deflector (polygon mirror) has been proposed for a tandem color machine. According to this method, plural beams of respective color components (for example, yellow, magenta, cyan, and black) emitted from the corresponding light sources undergo processing in the pre-deflection optical systems, while they are combined into a single beam to go incident on the polygon mirror. The beam deflected on the polygon mirror passes through the fθ lens forming the post-deflection optical system, after which it is separated into beams of the respective color components that are irradiated onto the photoconductive drums of the respective color components.

Incidentally, it is desirable for the optical beam scanning apparatus that the position (loci) of a scanning line in a specific scanning line region on the photoconductive drum always stays at a specific position (loci). However, because of the accuracy of the geometrical arrangement and deformation of the respective optical elements within the optical beam scanning apparatus (for example, a shape error and a posture error of the fθ lens in the post-deflection optical system, and a shape error and a posture error of the post-deflection bending mirror, and so forth), as is shown in FIG. 1A, a scanning line actually curves in the sub-scanning direction as is shown by the scanning line b indicated by a broken line with respect to the ideal scanning line a indicated by a solid line. This phenomenon is referred to as "the curve of the scanning line".

Herein, "main scanning direction" means a direction in which each laser beam is deflected (scanned) by the optical defector in the optical beam scanning apparatus, and "sub-scanning direction" means a direction orthogonal to both the main scanning direction and the optical axis direction used as the reference of deflection operations provided to a laser beam by the optical deflector for a laser beam deflected (scanned) by the optical deflector to travel in the main scanning direction.

In addition, as is shown in FIG. 1B, the actual scanning line d indicated by a broken line is inclined in the sub-scanning direction with respect to the ideal scanning line c indicated by a solid line. This phenomenon is referred to as "inclination of the scanning line".

The curve and the inclination of the scanning line as described above have a considerable influence on the image quality of an image to be formed. In particular, they give a significant influence on the quality of an image to be formed in an optical beam scanning apparatus and an image forming apparatus for a 4-consecutive tandem color machine, because the curve and the inclination of the scanning line differ from color to color.

Such being the case, an optical beam scanning apparatus and an image forming apparatus including adjusting means for adjusting the inclination and the curve of the scanning line have been proposed.

According to an optical beam scanning apparatus and an image forming apparatus proposed in JP-A-2004-12596, the center portion of the correction optical element is deformed to be twisted within a plane defined by the main scanning direction and the sub-scanning direction, while one end of the correction optical element is rotated about the fulcrum parallel to the optical axis direction on the other end. This configuration makes it possible to adjust the inclination of the scanning line and the curve of the scanning line.

Also, according to an optical beam scanning apparatus and an image forming apparatus proposed in JP-A-2006-17881, adjusting means for the curve of the scanning line is provided in the center portion of a reflection mirror, which is one of optical members disposed on the optical path of each laser beam. This configuration makes it possible to adjust the curve of the scanning line by a laser beam emitted from the light source with ease.

Further, according to an optical beam scanning apparatus and an image forming apparatus proposed in JP-A-2002-182145, a dell screw is provided to the lens holder to adjust the curve of the scanning line by forcedly bending two long plastic lenses in the sub-scanning direction of a laser beam, and an adjusting screw to correct the inclination of the scanning line by causing the two long plastic lenses to incline integrally with the lens holder is also provided. This configuration makes it possible to adjust both the curves and the inclinations of plural scanning lines.

According to the techniques proposed in JP-A-2004-12596, and JP-A-2002-182145, the optical element of a shape having the curvature in the main scanning direction is deformed. This configuration, however, raises a problem that an influence is provided on the fθ characteristic or the like. In addition, a pressure is applied by the adjusting screw and the dell screw used to twist or bend the long plastic lenses. This configuration, however, poses a problem that the lenses are susceptible to deformation induced by internal stress because they are made of a plastic material.

SUMMARY OF THE INVENTION

The present invention was devised in view of the foregoing, and therefore has an object to provide an optical beam scanning apparatus capable of adjusting the curve and the inclination of the scanning line with ease and at high accuracy and an image forming apparatus equipped with the optical beam scanning apparatus.

In order to solve the problems discussed above, an optical beam scanning apparatus according to one aspect of the present invention includes a fixing mechanism configured to fix part of a parallel plate provided within an optical housing, and a twist angle adjusting mechanism configured to adjust an angle of twist of the parallel plate by rotating, in a specific direction, the parallel plate having the part thereof being fixed with the fixing mechanism.

In order to solve the problems discussed above, an image forming apparatus according to another aspect of the present invention is equipped with an optical beam scanning apparatus in which plural optical members that irradiate scanning lines by beams emitted from plural light sources individually onto corresponding photoconductors are disposed within an optical housing, wherein the optical beam scanning apparatus includes a fixing mechanism configured to fix part of a parallel plate provided within the optical housing, and a twist angle adjusting mechanism configured to adjust an angle of twist of the parallel plate by rotating, in a specific direction, the parallel plate having the part thereof being fixed with the fixing mechanism.

In the optical beam scanning apparatus according to the firstly mentioned aspect of the present invention, part of the parallel plate provided within the optical housing is fixed, and an angle of twist of the parallel plate is adjusted by rotating, in a specific direction, the parallel plate having the part thereof being fixed.

The image forming apparatus according to the secondly mentioned aspect of the present invention is equipped with an optical beam scanning apparatus, in which plural optical members that irradiate scanning lines by beams emitted from plural light sources individually onto the corresponding photoconductors are disposed within the optical housing. In the optical beam scanning apparatus, part of the parallel plate provided within the optical housing is fixed, and an angle of twist of the parallel plate is adjusted by rotating, in a specific direction, the parallel plate having the part thereof being fixed.

BRIEF DESCRIPTION OF THE DRAWINGS

In the drawings:

FIG. 2 is a view showing the configuration of an image forming apparatus incorporating an optical beam scanning apparatus to which the present invention is applied;

DETAILED DESCRIPTION OF THE PREFERRED EMBODIMENTS

Figure 1:
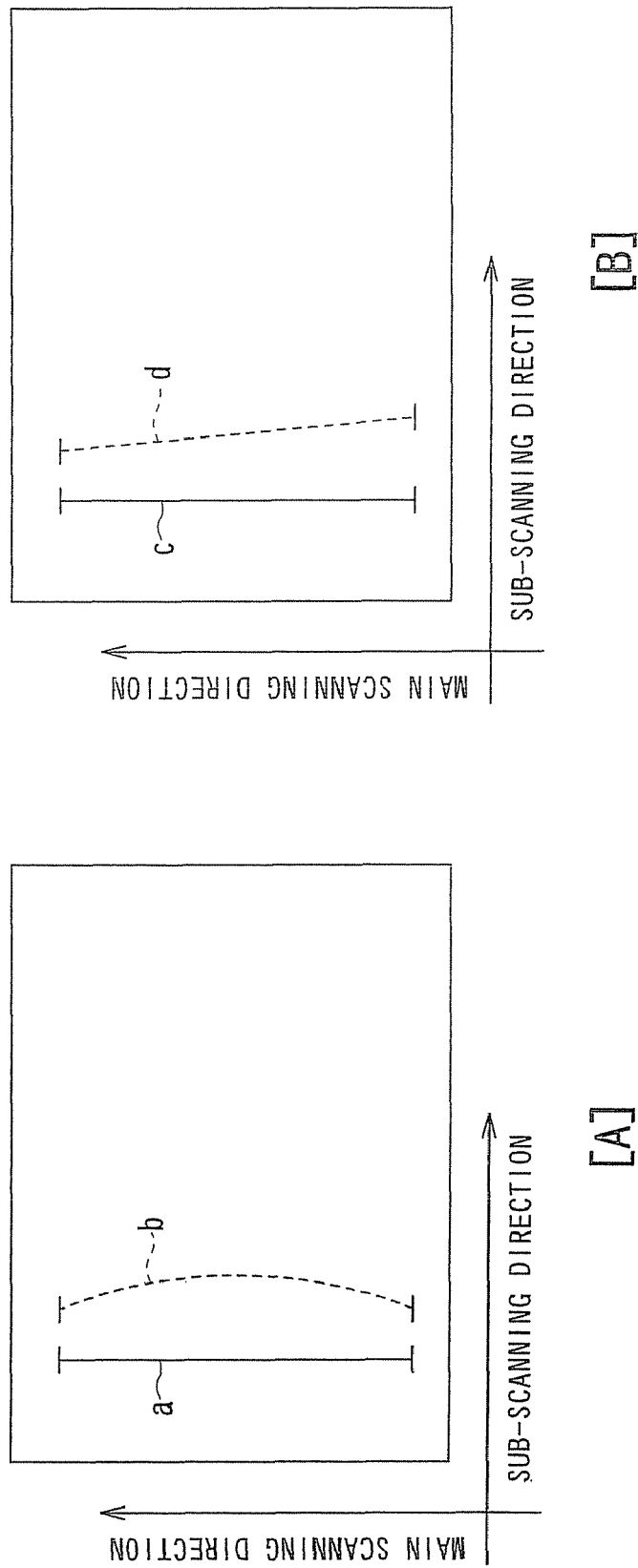
FIG. 1 is an explanatory view used to describe the curve and the inclination of the scanning line caused in an optical beam scanning apparatus and an image forming apparatus in the related art.

Hereinafter, embodiments of the present invention will be described with reference to the drawings.

FIG. 2 shows the configuration of an image forming apparatus 1 incorporating an optical beam scanning apparatus 11 to which the present invention is applied. Because the image forming apparatus 1 normally uses four kinds of image data separated in colors for respective color components including Y (yellow), M (magenta), C (cyan), and B (black) and four sets of various devices used to form images of the respective color components corresponding to Y, M, C, and B, the image data for the respective color components and the corresponding devices are identified by appending capitals Y, M, C, and B as a suffix.

As is shown in FIG. 2, the image forming apparatus 1 includes first through fourth image forming portions 12Y, 12M, 12C, and 12B that form images of respective color components separated in colors.

The image forming portions 12 (12Y, 12M, 12C, and 12B) are disposed below the optical beam scanning apparatus 11 at the corresponding positions to which laser beams L (LY, LM, LC, and LB) of the respective color components are irradiated by a first post-deflection bending mirror 39B and third post-deflection bending mirrors 41Y, 41M, and 41C in the optical beam scanning apparatus 11 in order of the image forming portions 12Y, 12M, 12C, and 1213.

An endless carrying belt 13 that carries a recording sheet of paper P, onto which images formed individually by the image forming portions 12 (12Y, 12M, 12C, and 12B) are transferred, is disposed below the image forming portions 12 (12Y, 12M, 12C, and 12B).

The carrying belt 13 is pulled across a belt driving roller 14 rotated in the direction indicated by an arrow by an unillustrated motor and a tension roller 15, and is therefore rotated at a specific velocity in the direction in which the belt driving roller 14 is rotated.

The image forming portions 12 (12Y, 12M, 12C, and 12B) are formed in a cylindrical shape to be able to rotate in the direction indicated by the arrow, and respectively include photoconductive drums 16Y, 16M, 16C, and 16B on which electrostatic latent images corresponding to images exposed by the optical beam scanning apparatus 11 are formed.

On the periphery of the photoconductive drums 16 (16Y, 16M, 16C, and 16B), the following are disposed respectively in order in the direction in which the photoconductive drums 16 (16Y, 16M, 16C, and 16B) are rotated: charging devices 17 (17Y, 17M, 17C, and 17B) that confer specific potential to the surfaces of the photoconductive drums 16 (16Y, 16M, 16C, and 16B), developing devices 18 (18Y, 18M, 18C, and 18B) that develop the electrostatic latent images formed on the surfaces of the photoconductive drums 16 (16Y, 16M, 16C, and 16B) by supplying toners of the corresponding colors, transferring devices 19 (19Y, 19M, 19C, and 19B) that transfer toner images on the photoconductive drums 16 (16Y, 16M, 16C, and 16B) onto a recording medium, that is, a recording sheet of paper P, carried by the carrying belt 13, cleaners 20 (20Y, 20M, 20C, and 208) that remove residual toner on the photoconductive drums 16 (16Y, 16M, 16C, and 16B), and static erasers 21 (21Y, 21M, 21C, and 21B) that remove residual potential remaining on the photoconductive drums 16 (16Y, 16M, 16C, and 16B) after the toner images are transferred.

The transferring devices 19 (19Y, 19M, 19C, and 19B) respectively oppose the photoconductive drums 16 (16Y, 16M, 16C, and 16B) from the back surface of the carrying belt 13 while the carrying belt 13 is present between the photoconductive drums 16 (16Y, 16M, 16C, and 16B) and the selves.

A paper cassette 22 accommodating recording sheets of paper P, on which images formed by the image forming portions 12 (12Y, 12M, 12C, and 12B) are transferred, is disposed below the carrying belt 13.

A feeding roller 23 that is formed almost in a semicircular shape and feeds recording sheets of paper P accommodated in the paper cassette 22 one by one from the top, on the side in close proximity to the tension roller 15 is disposed at one end of cassette 22.

In a sheet path (carrying path) from the feeding roller 23 to the tension roller 15, a registration roller 24 that matches the top end of a single recording sheet of paper P taken out from the cassette 22 with the top end of the toner image formed on the photoconductive drum 16B in the image forming portion 12B (black) is disposed.

At the position in close proximity to the tension roller 15 between the registration roller 24 and the first image forming portion 12Y and substantially opposing the position on the outer periphery of the carrying belt 13 corresponding to the position at which the tension roller 15 and the carrying belt 13 come in contact with each other, an attraction roller 25 that confers a specific electrostatic attraction force to a single recording sheet of paper P carried at specific timing by the registration roller 24 is disposed.

In close proximity to the carrying belt 13 on the side of the belt driving roller 14 and substantially on the outer periphery of the carrying belt 13 that comes into contact with the belt driving roller 14, a first registration sensor 26a and a second registration sensor 26b that detect the position of an image formed on the carrying belt 13 or an image transferred onto a recording sheet of paper P are disposed spaced apart by a certain distance in the axial direction of the belt driving roller 14 (because FIG. 2 is a sectional front view, the first registration sensor 26a positioned ahead of the sheet surface is not shown).

At the position on the outer periphery of the carrying belt 13 that comes into contact with the belt driving roller 14 where a recording sheet of paper P carried by the carrying belt 13 will not come into contact, a carrying belt cleaner 27 that removes toner or paper dust from a recording sheet of paper P adhering on the carrying belt 13 is disposed.

In a direction (toward the downstream end) in which a recording sheet of paper P carried by the carrying belt is separated from the belt driving roller 14 and carried further, a fixing device 28 that fixes the toner image, which has been transferred onto the recording sheet of paper P, on the recording sheet of paper P is disposed.

Figure 3:
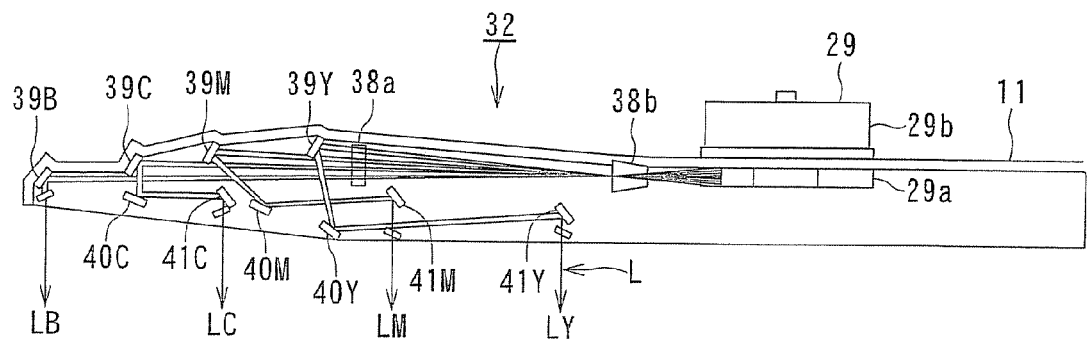
FIG. 3 is a view showing the detailed configuration of the optical beam scanning apparatus of FIG. 2.
Figure 4:
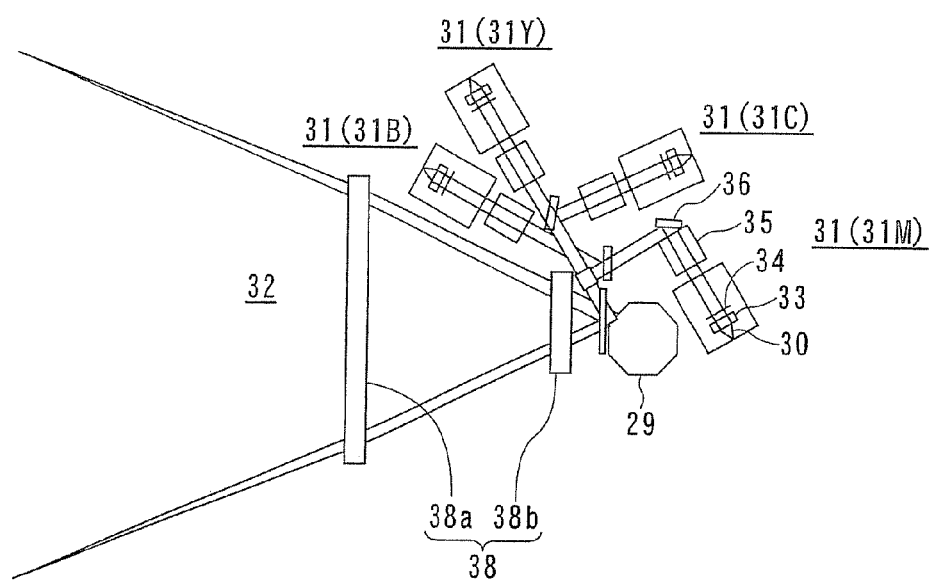
FIG. 4 is another view showing the detailed configuration of the optical beam scanning apparatus of FIG. 2.

FIG. 3 and FIG. 4 show the configuration of the optical beam scanning apparatus 11 of FIG. 2 in detail.

The optical beam scanning apparatus 11 includes an optical deflector 29 comprising a polygonal mirror main body (so-called polygon mirror) 29a having, for example, eight plane reflecting surfaces (plane reflecting mirrors) disposed to form a regular polygon and a motor 29b that rotates the polygonal mirror main body 29a in the main scanning direction at a specific velocity, and light sources 30 (30Y, 30M, 30C, and 30B) that output optical beams, respectively, toward the first through fourth image forming portions 12 (12Y, 12M, 12C, and 12B) of FIG. 2.

The optical deflector 29 is deflection means for deflecting (scanning) optical beams (laser beams) emitted from the light sources 30 (30Y, 30M, 30C, and 30B) toward the image planes disposed at the specific positions, that is, toward the outer peripheral surfaces of the photoconductive drums 16Y, 16M, 16C, and 16B in the first through fourth image forming portions 12Y, 12M, 12C, and 12B, respectively, at a specific linear velocity. In addition, pre-deflection optical systems 31 (31Y, 31M, 31C, and 31B) are disposed between the optical deflector 29 and the light sources 30 (30Y, 30M, 30C, and 30B), and a post-deflection optical system 32 is disposed between the optical deflector 29 and the image planes.

A direction in which the respective laser beams are deflected (scanned) by the optical deflector 29 is referred to as "main scanning direction", and a direction orthogonal to both the main scanning direction and the axial line used as the reference of deflection operations provided to the laser beams by the optical deflector 29 for the laser beams scanned (deflected) by the optical deflector 29 to travel in the main scanning direction is referred to as "sub-scanning direction".

As is shown in FIG. 4, the pre-deflection optical systems 31 respectively include light sources 30 (30Y, 30M, 30C, and 30B) comprising semiconductor laser devices and provided for respective color components, finite focusing lenses 33 (33Y, 33M, 33C, and 33B) that confer a specific focusing property to laser beams emitted from the light sources 30 (30Y, 30M, 30C, and 30B), apertures 34 (34Y, 34M, 34C, and 34B) that confer an arbitrary sectional beam shape to laser beams L having passed through the finite focusing lenses 33

(33Y, 33M, 33C, and 33B), and cylinder lenses 35 (35Y, 35M, 35C, and 35B) that further confer a specific focusing property in the sub-scanning direction to the laser beams L having passed through the apertures 34 (34Y, 34M, 34C, and 34B). They trim the sectional beam shape of laser beams emitted from the respective light sources 30 (30Y, 30M, 30C, and 30B) into a specific shape and then guide the laser beams to the reflection surface of the optical deflector 29.

For a laser beam LC for cyan exiting from the cylinder lens 35C, the optical path is bent by a bending mirror 36C, after which it is guided to the reflection surface of the optical deflector 29 by traveling straight through an optical path combining optical component 37. For a laser beam LB for black exiting from the cylinder lens 35B, the optical path is bent by a bending mirror 36B, after which it is guided to the reflection surface of the optical deflector 29 by being reflected on the optical path combining optical component 37. A laser beam LY for yellow exiting from the cylinder lens 35Y passes by above the bending mirror 36C, after which it is guided to the reflection surface of the optical deflector 29 by traveling straight through the optical path combining optical component 37. For a laser beam LM for magenta exiting from the cylinder lens 35M, the optical path is bent by a bending mirror 36M for the laser beam LM to pass by above the bending mirror 36B, after which it is guided to the reflection surface of the optical deflector 29 by being reflected on the optical path combining optical component 37.

The post-deflection optical system 32 includes an fθ lens 38 (fθ lenses 38a and 38b) comprising a set of two lenses and used to optimize the shapes and the positions on the image planes of the laser beams L (LY, LM, LC, and LB) deflected (scanned) by the polygonal mirror main body 29a, a horizontal synchronization detection photo-detector (not shown) that detects the respective laser beams L to match the horizontal synchronizations of the laser beams L (LY, LM, LC, and LB) having passed through the fθ lens 38 (fθ lenses 38a and 38b), a horizontal synchronization bending mirror (not shown) that bends the respective laser beams L toward the horizontal synchronization detection photo-detector, an optical path correction element (not shown) disposed between the horizontal synchronization bending mirror and the horizontal synchronization detection photo-detector to bring the laser beams L (LY, LM, LC, and LB) of the respective color components reflected on the horizontal synchronization bending mirror toward the horizontal synchronization detection photo-detector almost into agreement with the position of incidence on the detection surface of the horizontal synchronization detection photo-detector, and plural post-deflection bending mirrors 39Y, 40Y, and 41Y (yellow); 39M, 40M, and 41M (magenta); 39C, 40C, and 41C (cyan); and 39B (black) that guide the laser beams L (LY, LM, LC, and LB) of the respective color components exiting from the fθ lens 38 (38a and 38b) to the corresponding photoconductive drums 16 (16Y, 16M, 16C, and 16B).

Figure 5:
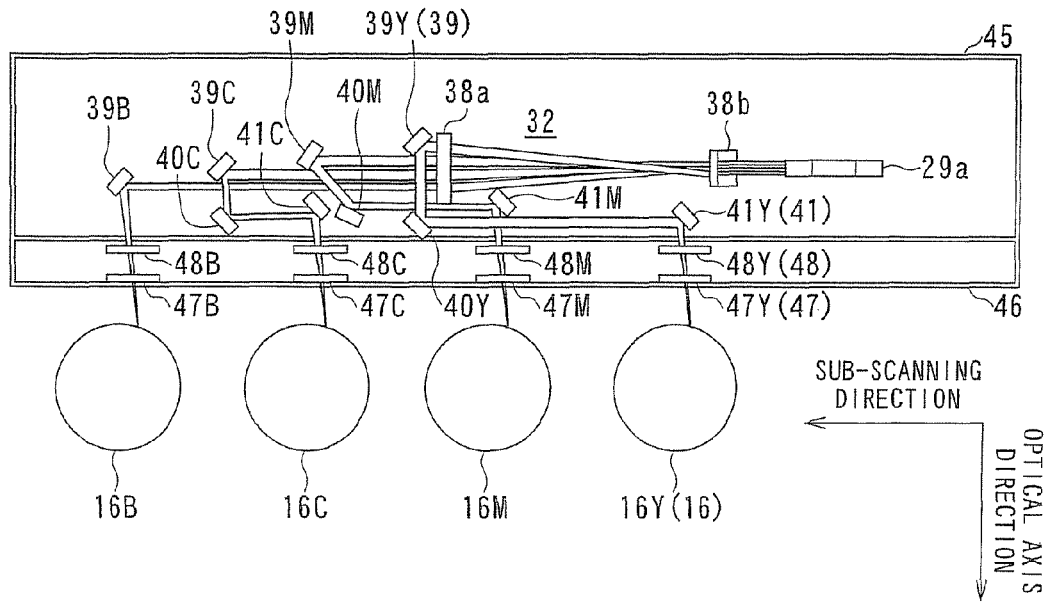
FIG. 5 is a view schematically showing the configuration when the present invention is applied to an optical beam scanning apparatus and an image forming apparatus for a 4-consecutive tandem color machine.

With reference to FIG. 5, the schematic configuration in a case where the present invention is applied to the optical beam scanning apparatus 11 and the image forming apparatus 1 for a 4-consecutive tandem color machine will be described.

As is shown in FIG. 5, each pre-deflection optical system 31 and the post-deflection optical system 32 are disposed so as to be enclosed completely by an optical unit housing 45 and a housing cover 46, and correction parallel plates 48 (48Y, 48M, 48C, and 48B), for example, glass, are provided, respectively, in front of dust-proof glass 47 (47Y, 47M, 47C, and 47B) provided to the post-deflection optical system 32 in advance.

A material of the parallel plates 48 is not limited to glass, and various materials are also applicable. However, because the parallel plates 48 of a rectangular shape are twisted through the application of pressure as will be described below, it is preferable to choose a material that hardly undergoes deformation by internal stress (for example, glass).

Basically, the parallel plates 48 (48Y, 48M, 48C, and 48B) are required for the respective color components. However, for example, when the curves and the inclinations of the scanning lines show similar tendencies, the number of the parallel plates 48 may be reduced to the number other than four, that is, three, two, or one by using a common parallel plate 48. The parallel plates 48 may be furnished with the capability as dust-proof glass so as to be used integrally with the dust-proof glass 47.

Figure 6:
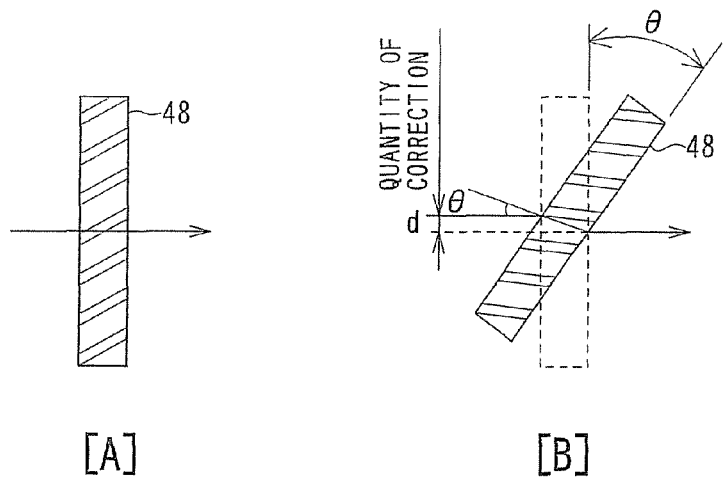
FIG. 6 is an explanatory view used to describe the concept of a method for correcting the inclination of the scanning line in the optical beam scanning apparatus of the present invention.

The concept of the method for correcting the inclination of the scanning line in the optical beam scanning apparatus 11 of the present invention will now be described with reference to FIG. 6.

As is shown in FIG. 6A, when a laser beam from the post-deflection optical system 32 goes incident on the parallel plate 48 perpendicularly at the angle of incident of 0 degree, because the angle of refraction is 0 degree, the laser beam comes inside the parallel plate 48 without being refracted at the boundary of the parallel plate 48, and goes out intact without being refracted. Meanwhile, as is shown in FIG. 6B, when the parallel plate 48 is twisted by an angle θ (torque is conferred) by any appropriate means, θ is the angle at which a laser beam from the post-deflection optical system 32 goes incident on the parallel plate 48, and the laser beam is refracted at the boundary of the parallel plate 48 when it comes inside the parallel plate 48. It goes out from the parallel plate 48 after it is refracted again at the angle of refraction of θ at the boundary of the parallel plate 48. Accordingly, by twisting the parallel plate 48 by any appropriate means by the angle θ, the position at which the laser beam is scanned on the photoconductive drum 16 is varied by d in comparison with a case where no twist is added. On the contrary, when the parallel plate 48 is twisted by the angle −θ by any appropriate means (that is, twisted by the angle θ in the opposite direction), the position at which the laser beam is scanned on the photoconductive drum 16 is varied by −d in comparison with a case where no twist is added. The variance of the position is defined as a quantity of correction, d. It should be noted that "d" takes a positive value. In addition, the angle θ to twist the parallel plate 48 is defined as "the angle of twist, θ".

In view of the foregoing, as are shown in FIGS. 7A and 7B, the parallel plate 48 having a uniform cross section with the length L, the thickness a, and the width b is fixed at one side and twisted at the opposite side in the direction indicted by an arrow X. FIG. 7A is the cross section of the parallel plate 48 provided to the housing cover 46 in the main scanning direction, and FIG. 7B is the cross section of the parallel plate 48 provided to the housing cover 46 in the sub-scanning direction. When configured in this manner, the angle of twist, θ, yielded by twisting the parallel plate 48 is proportional to the length l from the fixed one side of the parallel plate 48. Hence, as is shown in FIG. 7C, the quantity of correction, d, increases with distance from the fixed one side of the parallel plate 48.

Figure 8:
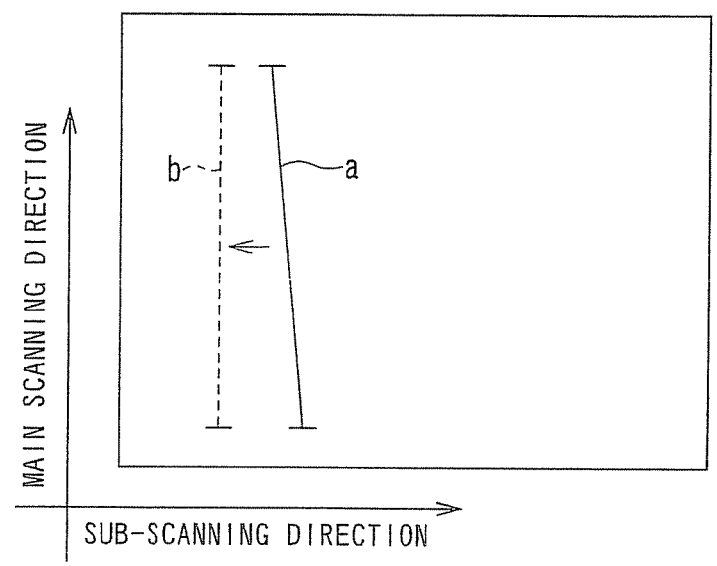
FIG. 8 is a view showing a concrete example of the method for correcting the inclination of the scanning line in the optical beam scanning apparatus of the present invention.

Accordingly, as is shown in FIG. 8, by twisting the parallel plate 48 by a specific quantity in a specific direction, the scanning line a indicted by a solid line can be corrected to the scanning line b indicated by a broken line, thereby making it possible to correct the inclination of the scanning line. It is thus possible to adjust the inclination of the scanning line with ease and at high accuracy.

Figure 7:
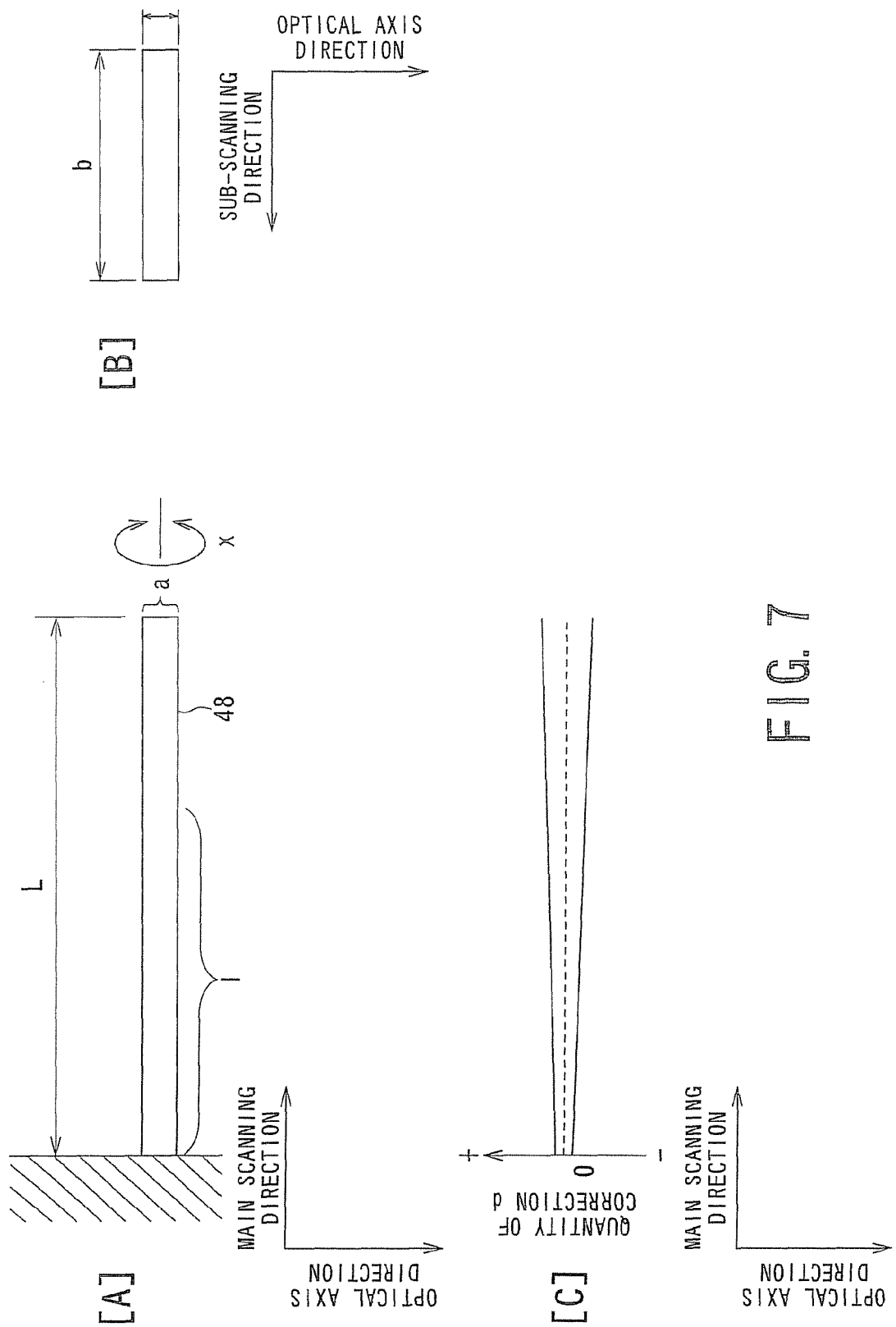
FIG. 7 is an explanatory view used to describe the concept of a method for correcting the inclination of the scanning line in the optical beam scanning apparatus of the present invention.
Figure 9:
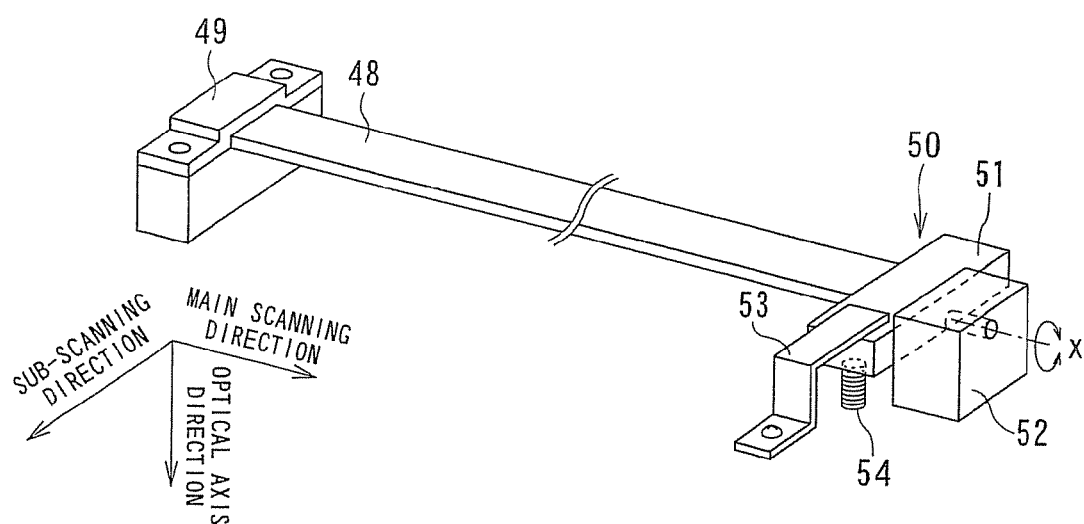
FIG. 9 is a view showing the outward appearance of an inclination correcting mechanism when the inclination of the scanning line is corrected using the method for correcting the inclination of the scanning line in FIG. 7.

FIG. 9 shows the outward appearance of an inclination correcting mechanism when the inclination of the scanning line is corrected using the method for correcting the inclination of the scanning line in FIG. 7.

As is shown in FIG. 9, the end at one side of the parallel plate 48 is fixed with a fixing member 49 provided within the housing cover 46 in advance, while the opposite side of the parallel plate 48 is fixed with a movable member 51 of a twist angle adjusting mechanism 50. The rotating shaft of the movable member 51 of the twist angle adjusting mechanism 50 is inserted into a rotating bearing 52 provided to the housing cover 46.

The twist angle adjusting mechanism 50 is provided, in advance, with a leaf spring 53 that applies a pressure to the movable member 51 from the upper portion at a location with a specific distance from its center of rotations, and a set screw 54 that pushes up the movable member 51 from the lower portion. The movable member 51 is rotated (twisted) in response to a quantity of movements of the set screw 54 to give a twist to the parallel plate 48 for the inclination of the scanning line to be corrected by a desired quantity of correction, d.

It goes without saying that a twist may be given to the parallel plate 48 in a direction opposite to the case in FIG. 9 by providing the leaf spring 53 and the set screw 54 provided to the movable member 51 on the opposite side.

By using the twist supporting method of the parallel plate 48 in FIG. 7 through FIG. 9, the inclination (first order linear component) of the scanning line can be corrected. However, in order to achieve a desired scanning line to obtain a high image quality, it is also necessary to correct the curve (quadratic curve component) of the scanning line as is shown in FIG. 1A. Such being the case, the method for correcting the curve of the scanning line will be described hereinafter.

The concept of the method for correcting the curve of the scanning line in the optical beam scanning apparatus 11 of the present invention will be described with reference to FIG. 10.

As is shown in FIG. 10A, the parallel plate 48 having a uniform cross section with the length L, the thickness a, and the width b is fixed at the center portion (the position at which the curve of the scanning line reaches the extreme value), and twisted in the direction indicated by an arrow X at one side alone. Accordingly, the angle of twist, θ, yielded by twisting the parallel plate 48 becomes almost 0 on the side (left) where no twist is given, whereas it is proportional to the length l from the fixed center portion of the parallel plate 48 on the side (right) where a twist is given. The distribution of the quantity of correction, d, is therefore the distribution shown in FIG. 10B.

Accordingly, as is shown in FIG. 10C, it is possible to correct the scanning line a indicted by a solid line to the scanning line b indicated by a broken line. That is to say, by correcting the curve (quadratic curve component) of the scanning line, it is possible to bring the scanning line closer to a state where the scanning line has only the inclination (first order linear component) of the scanning line (for example, the scanning line c indicated by an alternate long and short dash line). By also correcting the inclination of the scanning line b, for which the curve of the scanning line has been corrected, using the method in FIG. 7 through FIG. 9 or the tilt inclination correction method using the post-deflection bending mirrors 39, 40 and 41 thereafter, it is possible to correct the curve (quadratic curve component) of the scanning line a as is shown in FIG. 10C. It is thus possible to adjust the curve and the inclination of the scanning line with ease and at high accuracy.

Figure 10:
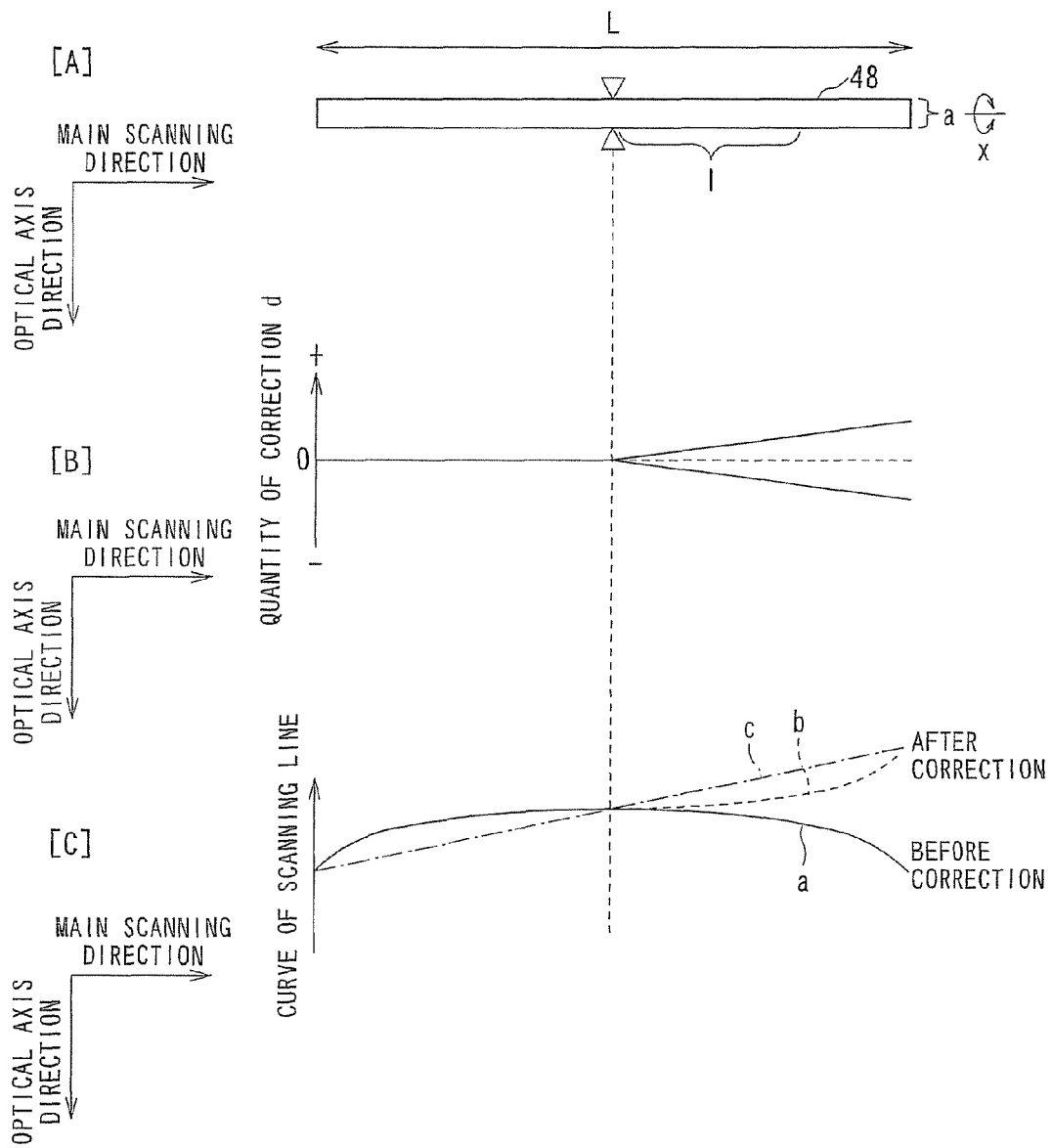
FIG. 10 is an explanatory view used to describe the concept of a method for correcting the curve of the scanning line in the optical beam scanning apparatus of the present invention.

The parallel plate 48 is fixed at the center portion in FIG. 10. However, the present invention is not limited to such a case, and for example, a position about ⅓ of the parallel plate 48 may be fixed in an appropriate manner in response to the curve and the inclination of the scanning line caused in the optical beam scanning apparatus 11 and the image forming apparatus 1.

Figure 11:
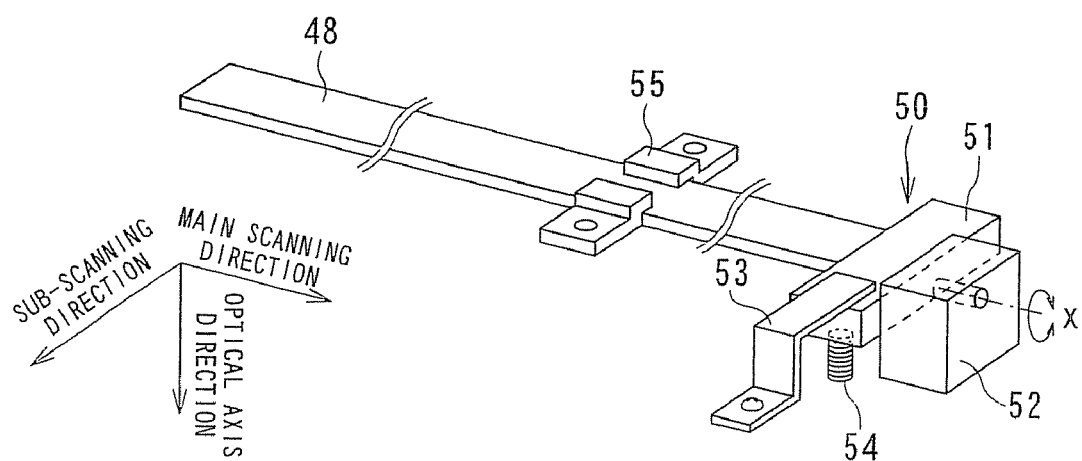
FIG. 11 is a view showing the outward appearance of a curve correcting mechanism when the curve of the scanning line is corrected using the method for correcting the curve of the scanning line of FIG. 10.

FIG. 11 shows the outward appearance of a curve correcting mechanism in a case where the curve of the scanning line is corrected using the method for correcting the curve of the scanning line in FIG. 10. Like components are labeled with like reference numerals with respect to the inclination correcting mechanism of FIG. 9, and descriptions of such components are not repeated herein.

As is shown in FIG. 11, the parallel plate 48 is fixed at the center portion with fixing members 55 provided within the housing cover 46 in advance, and the parallel plate 48 is also fixed to either one of respective sides with the movable member 51 of the twist angle adjusting mechanism 50. Each fixing member 55 is of a shape that does not block the optical path of a laser beam, that is, of a shape having an opening at the center of the fixing member 55.

The concept of another method for correcting the curve of the scanning line in the optical beams scanning apparatus 11 of the present invention will now be described with reference to FIG. 12.

As is shown in FIG. 12A, the parallel plate 48 having a uniform cross section with the length L, the thickness a, and the width b is fixed at the both sides, and is twisted at the center portion (the position at which the curve of the scanning line reaches the extreme value) in the rotational direction indicated by an arrow X. Accordingly, because the angle of twist, θ, yielded by twisting the parallel plate 48 is proportional to the length l from the fixed center portion of the parallel plate 48, the quantity of correction, d, has the distribution as shown in FIG. 12B.

Accordingly, as is shown in FIG. 12C, it is possible to correct the scanning line a indicated by a solid line to the scanning line b indicated by a broken line, thereby making it possible to correct the curve (quadratic curve component) of the scanning line. It should be noted that in a case as is shown in FIG. 12D where the scanning line c before correction indicated by a solid line has not only the curve (quadratic curve component) but also the inclination (first order linear component) at the same time, it is corrected to the scanning line d indicated by a broken line because the curve (quadratic curve component) of the scanning line is corrected first, and thence the inclination of the scanning line d, for which the curve of the scanning line has been corrected, is corrected using the method in FIG. 7 through FIG. 9 or the tilt inclination correction method using the post-deflection bending mirrors (first post-deflection bending mirrors 39, second post-deflection bending mirrors 40, and third post-deflection bending mirrors 41). Both the curve (quadratic curve component) and the inclination (first order linear component) of the scanning line c as shown in FIG. 12D can be therefore corrected.

It is thus possible to adjust the curve and the inclination of the scanning line with ease and at high accuracy.

Figure 12:
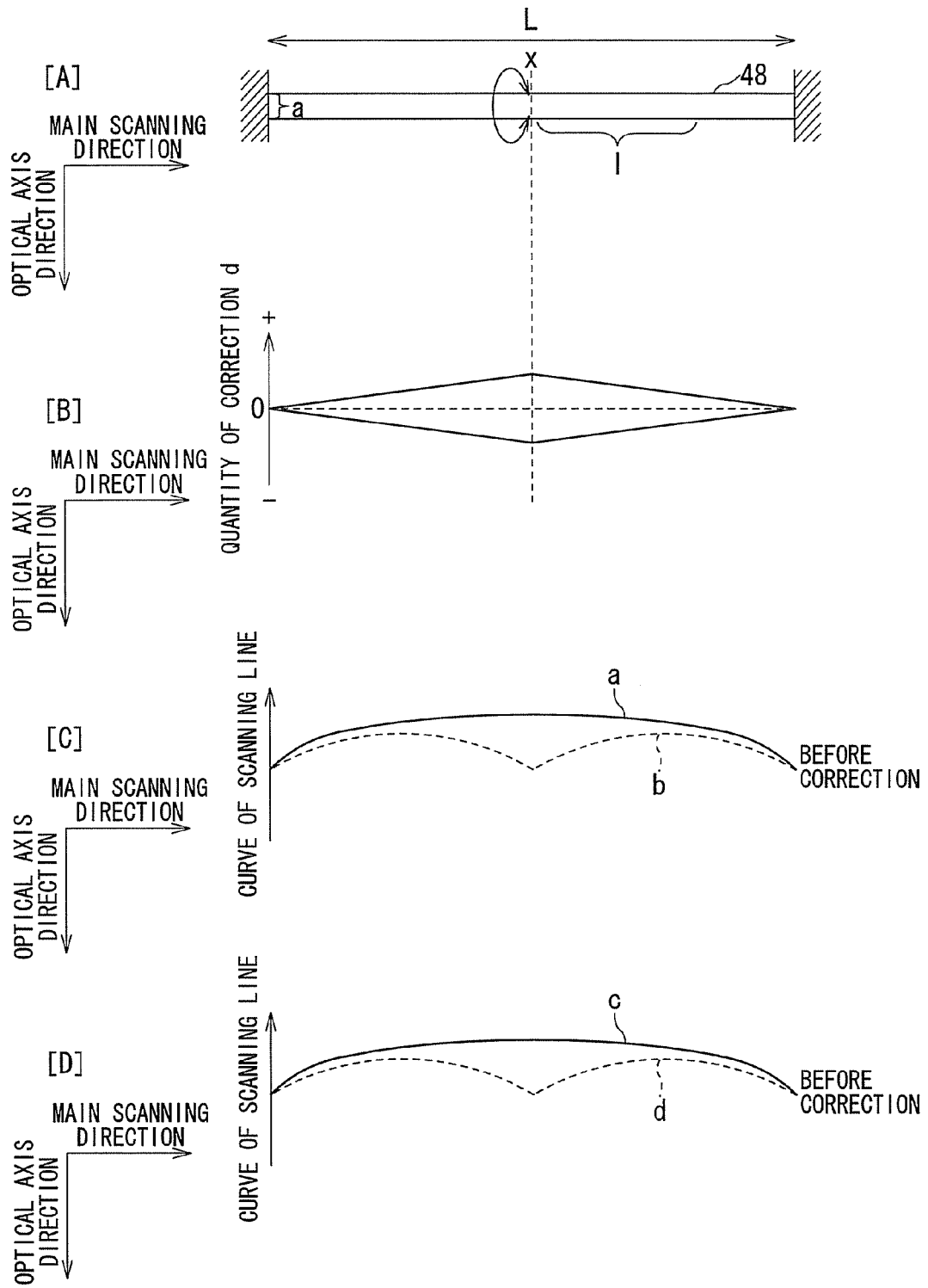
FIG. 12 is an explanatory view used to describe the concept of another method for correcting the curve of the scanning line in the optical beam scanning apparatus of the present invention.
Figure 13:
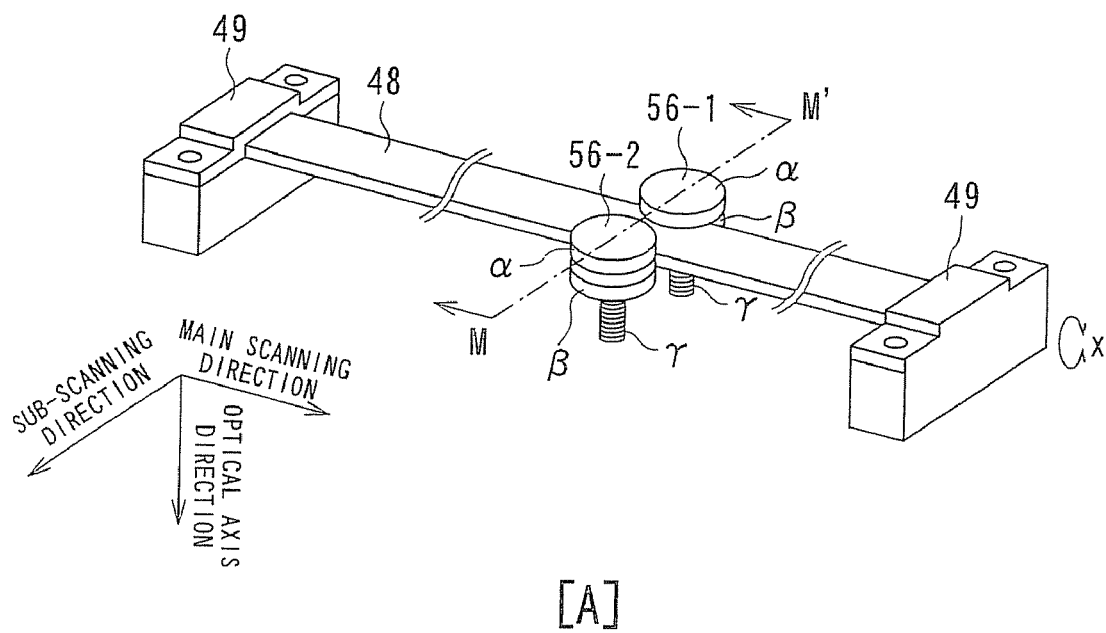
FIG. 13A is a view showing the outward appearance of a curve correcting mechanism when the curve of the scanning line is corrected using the method for correcting the curve of the scanning line of FIG. 12.
FIG. 13B is a cross section taken on the line M-M'.
Figure 13:
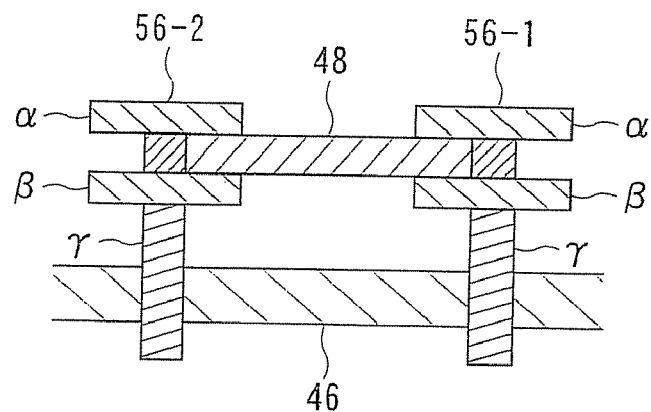

FIG. 13A shows the outward appearance of the curve correcting mechanism in a case where the curve of the scanning line is corrected using the method for correcting the curve of the scanning line in FIG. 12. Like components are labeled with like reference numerals with respect to the inclination correcting mechanism of FIG. 9, and descriptions of such components are not repeated herein.

As is shown in FIG. 13A, the parallel plate 48 is fixed at both sides with fixing members 49 provided within the housing cover 46 in advance, and the parallel plate 48 is also fixed at the center portion with bolt position mechanisms 56-1 and 56-2 (a mechanism comprising a bolt head α, a disc-shaped spacer β, and a bolt γ) of the twist angle adjusting mechanisms 50 while the parallel plate 48 is twisted in response to a quantity of movements of the bolt position mechanisms 56-1 and 56-2. The bolt position mechanisms 56-1 and 56-2 are of a shape that does not block the optical path of a laser beam. FIG. 13B is a cross section taken on the line M-M' of FIG. 13A.

Incidentally, the curve of the scanning line for a latent image includes not only a curve having a left-right symmetric degree of curve (for example, the scanning line a of FIG. 10), but also a curve having a left-right asymmetric degree of curve (that is, the degree of curve differs on the right and on the left). In the latter case, even the method for correcting the curve of the scanning line in FIG. 10 or FIG. 12 is used, it is difficult to correct the curve of the scanning line at high accuracy. Hereinafter, the method for correcting the curve of the scanning line having a left-right asymmetric degree of curve will be described.

The concept of another method for correcting the curve of the scanning line in the optical beam scanning apparatus 11 of the present invention will be described with reference to FIG. 14.

As is shown in FIG. 14A, the parallel plate 48 having a uniform cross section with the length L, the thickness a, and the width b is fixed at the center portion, and the parallel plate 48 is twisted on the both sides in the direction indicated by an arrow X. Accordingly, because the angle of twist, θ, yielded by twisting the parallel plate 48 is proportional to the length l from the fixed center portion of the parallel plate 48 on each side (left and right), the quantity of correction, d, has the distributions as shown in FIG. 14B. In addition, the quantity of correction, d, has a distribution that differs on the respective sides according to a manner in which the parallel plate 48 is twisted on each side.

Accordingly, as is shown in FIG. 14C, by making a twist on the right larger than on the left, it is possible to correct the scanning line a indicated by the solid line to the scanning line b indicated by a broken line, thereby making it possible to correct the curve (quadratic curve component) of the scanning line that differs on the right and the left. In the case of FIG. 14C, because the quantities of correction, d, on the right and the left can be adjusted by the magnitude of a twist, not only the curve (quadratic curve component) of the scanning line a, but also the inclination (first order linear component) of the scanning line caused by the correction of the curve can be corrected simultaneously.

It is thus possible to adjust the curve and the inclination of the scanning line with ease and at high accuracy.

Figure 14:
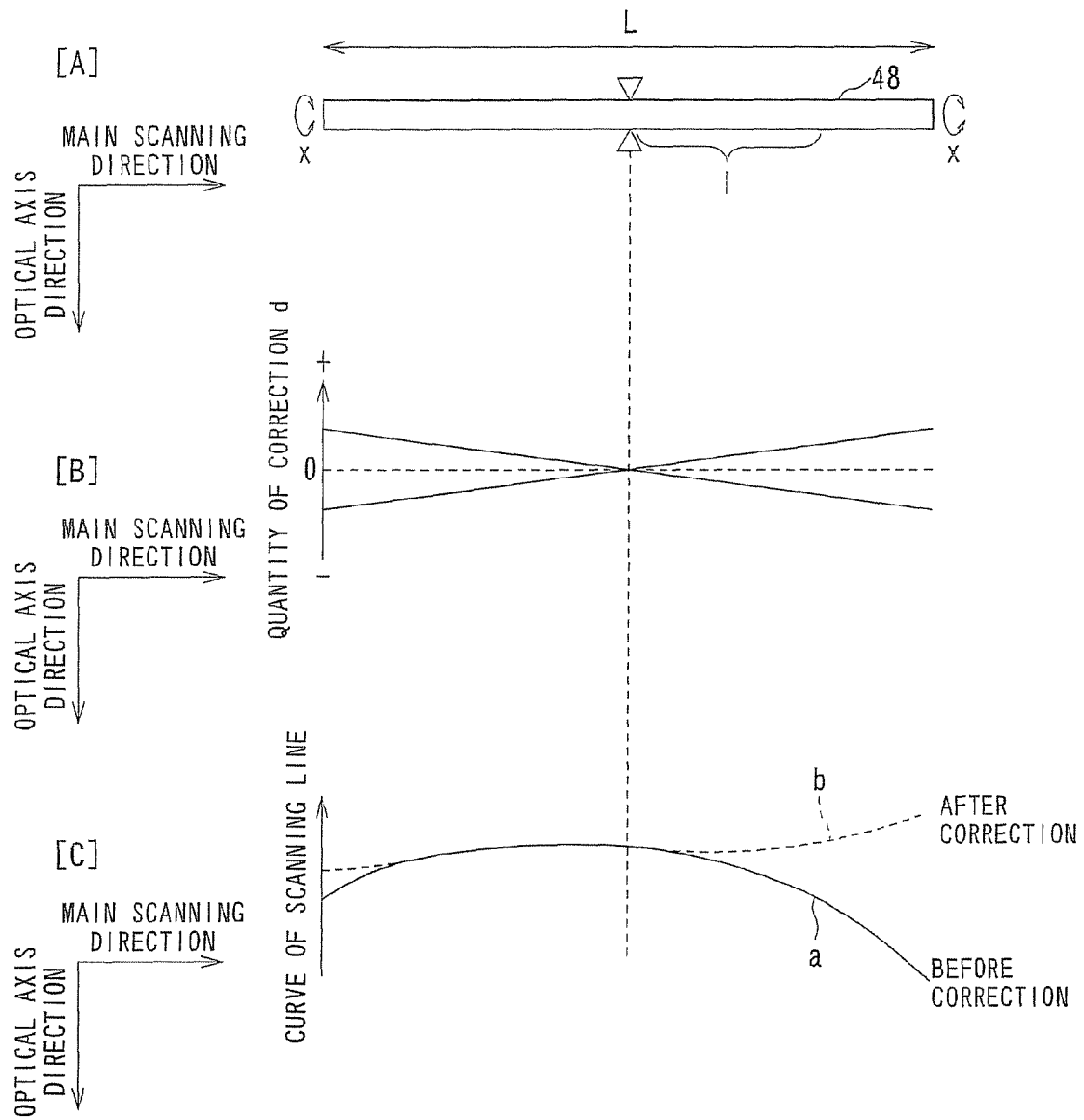
FIG. 14 is an explanatory view used to describe the concept of another method for correcting the curve of the scanning line in the optical beam scanning apparatus of the present invention.
Figure 15:
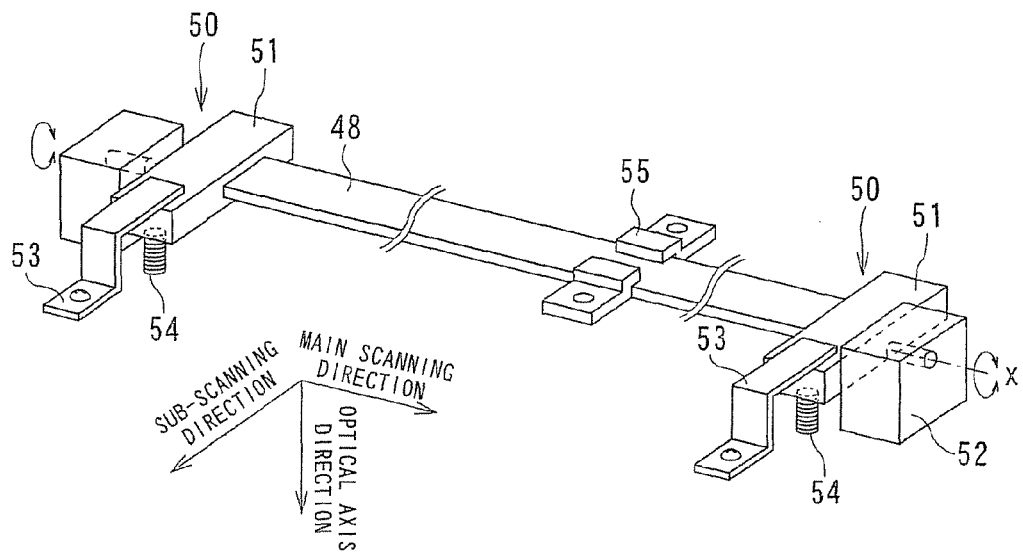
FIG. 15 is a view showing the outward appearance of the curve correcting mechanism when the curve of the scanning line is corrected using the method for correcting the curve of the scanning line in FIG. 14.

FIG. 15 shows the outward appearance of the curve correcting mechanism in a case where the curve of the scanning line is corrected using the method for correcting the curve of the scanning line in FIG. 14. Like components are labeled with like reference numerals with respect to the inclination correcting mechanism of FIG. 9 and the curve correcting mechanism of FIG. 11, and descriptions of these components are not repeated herein.

As is shown in FIG. 15, the parallel plate 48 is fixed at the center portion with the fixing members 55 provided within the housing cover 46 in advance, and the parallel plate 48 is also fixed at the both sides with the movable members 51 of the twist angle adjusting mechanisms 50. Each fixing member 55 is of a shape that does not block the optical path of a laser beam, that is, of a shape having an opening at the center portion of the fixing member 55.

Figure 16:
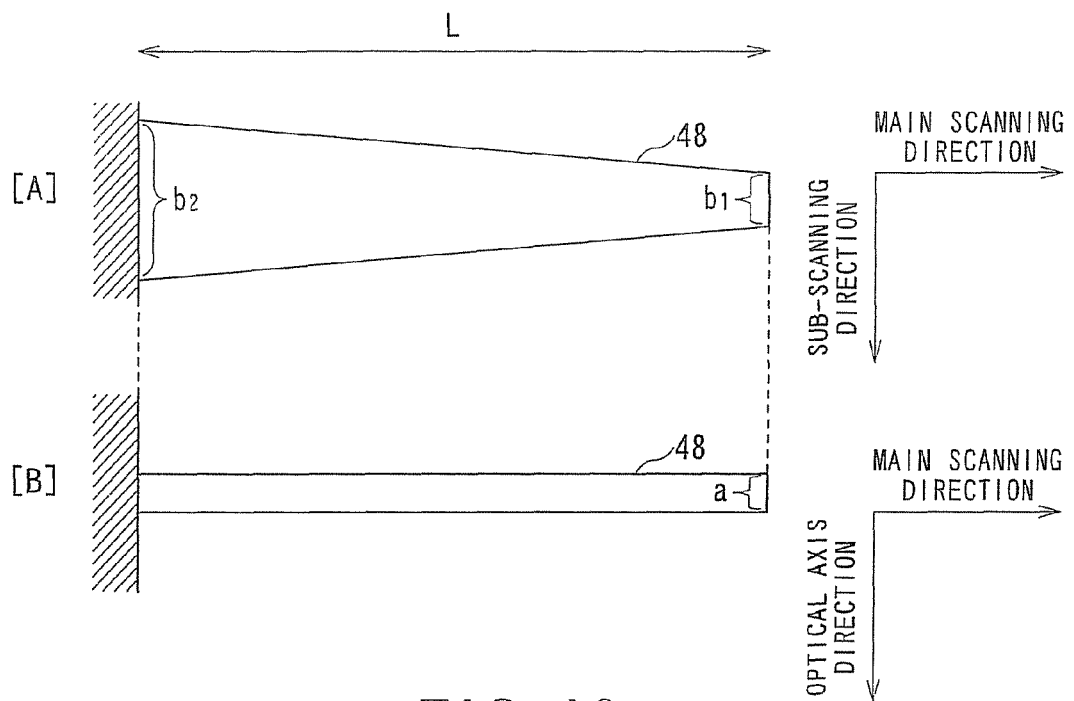
FIG. 16 is a view showing the configuration of a parallel plate whose width is varied, which is used when the curve and the inclination of the scanning line are corrected.

In a case where the width b of the parallel plate 48 is uniform, the angle of twist, θ, yielded in the parallel plate 48 is proportional to the length l from the fixed location (for example, at the position of the fixing member 49 of FIG. 9). Such being the case, as are shown in FIGS. 16A and 16B, by adjusting the angle of twist, θ, with the scanning position by varying the width b of the parallel plate 48 appropriately in a range of $b_1$ to $b_2$ from one side to the other side while keeping the thickness a uniform, it is possible to adjust the distribution of the quantity of correction, d, suitably to fit the conditions of the optical beam scanning apparatus 11 and the image forming apparatus 1. It should be noted that the shape of the parallel plate 48 is not limited to the shape shown in FIG. 16A, and it can be of any desired shape by varying the width b in accordance with the curve and the inclination of the scanning line caused in the optical beam scanning apparatus 11 and the image forming apparatus 1.

Figure 17:
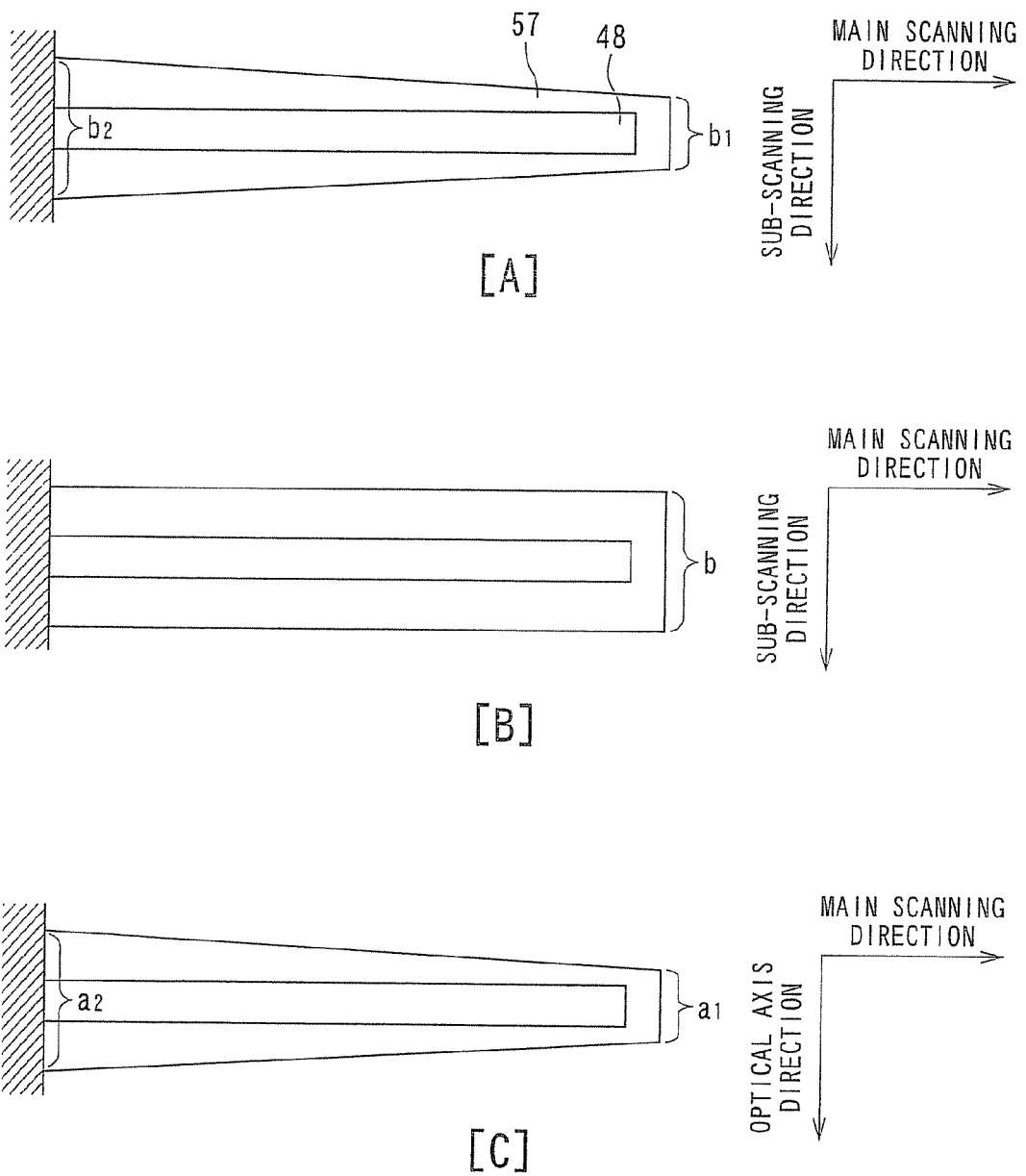
FIG. 17 is a view showing the configuration of a holder whose width is varied and the parallel plate, which are used when the curve and the inclination of the scanning line are corrected.

It should be noted, however, that the cost is increased by making the shape of the parallel plate 48 to a special shape by varying the width b of the parallel plate 48 as are shown in FIGS. 16A and 16B. Hence, as is shown in FIG. 17A, the parallel plate 48 may be embedded in close adhesion inside a holder 57 made of, for example, plastic, so that the parallel plate 48 stays in a specific state with respect to the photoconductive drum 16. The holder 57, in which the parallel plate 48 is embedded, is made to keep a shape having the width b varying, for example, in a range of $b_1$ to $b_2$ from one side to the other side. It is thus possible to adjust the distribution of the quantity of correction, d, according to various conditions by adjusting the angle of twist, θ, with the scanning position at low costs.

It goes without saying that the holder may be made to keep a shape having the thickness a varying from, for example, $a_1$ to $a_2$ in an appropriate manner while the width b is kept uniform as are shown in FIGS. 17B and 17C.

In the optical beam scanning apparatus 11 and the image forming apparatus 1 of FIG. 5, correction parallel plates 48 (48Y, 48M, 48C, and 48B) (for example, glass) are provided behind the post-deflection bending mirrors (first post-deflection bending mirrors 39, second post-deflection bending mirrors 40, and third post-deflection bending mirrors 41) and in front of the dust-proof glass 47 (47Y, 47M, 47C, and 47B) provided to the post-deflection optical system 32 in advance. Accordingly, because a laser beam coming incident on the parallel plate 48 contains all the errors, including an error of the scanning line in the post-deflection optical system 32 and an error of the scanning line in the post-deflection bending mirrors (first post-deflection bending mirror 39, second post-deflection bending mirror 40, and third post-deflection bending mirror 41), it is possible to correct the curve and the inclination of the scanning line with ease and at high accuracy.

Figure 18:
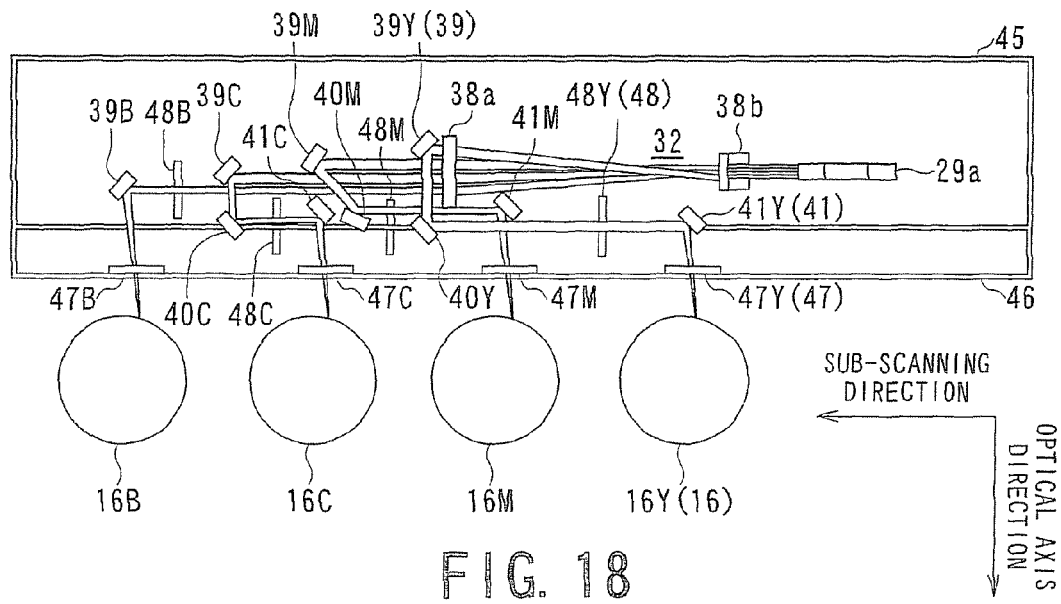
FIG. 18 is a view schematically showing another configuration when the present invention is applied to an optical beam scanning apparatus and an image forming apparatus for a 4-consecutive tandem color machine.

The present invention, however, is not limited to such a case. In a case where the parallel plates 48 cannot be provided in front of the dust-proof glass 47 (dust-proof glass 47B, dust-proof glass 47C, dust-proof glass 47M, and dust-proof glass 47Y) due to the limitation of a space, for example, as is shown in FIG. 18, the parallel plate 48 may be provided behind the fθ lens 38 (fθ lens 38a and fθ lens 38b) and somewhere in midway through the post-deflection mirrors (first post-deflection bending mirrors 39, second post-deflection bending mirrors 40, and third post-deflection bending mirrors 41).

Figure 19:
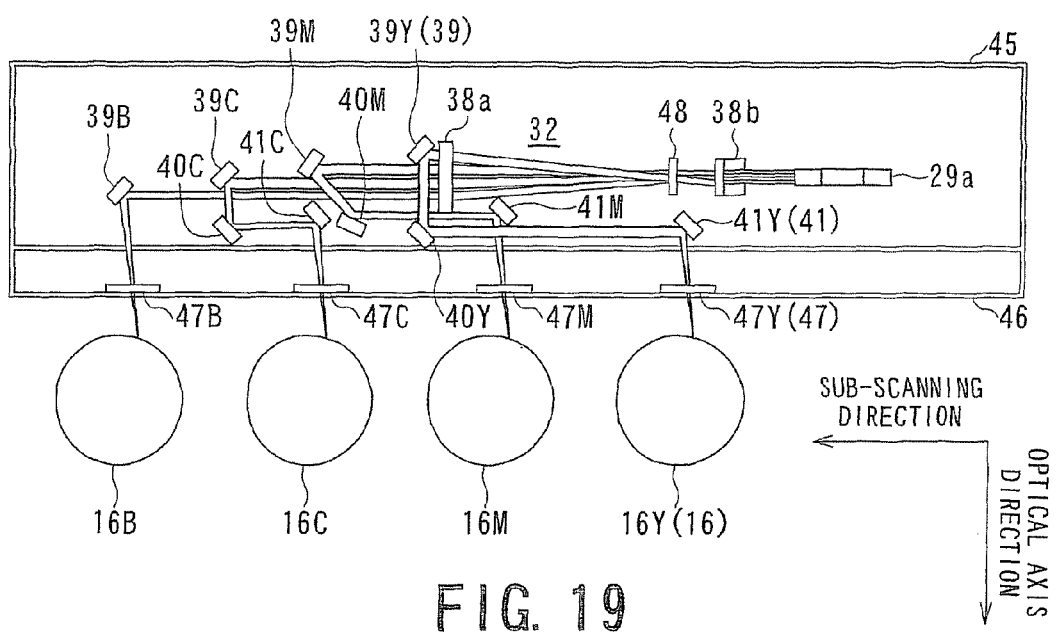
FIG. 19 is a view schematically showing still another configuration when the present invention is applied to an optical beam scanning apparatus and an image forming apparatus for a 4-consecutive tandem color machine.

In addition, in a case where the curves of the scanning lines in four colors or the like have common tendencies, as is shown in FIG. 19, the parallel plate 48 may be provided in front of the fθ lens 38 (fθ lens 38a and fθ lens 38b). This enables the curve of the scanning line to be corrected by merely providing a single parallel plate 48.

It goes without saying that it is preferable to provide the parallel plate 48 behind the post-deflection optical system 32 because when the parallel plate 48 is provided in front of the fθ lens 38 (fθ lens 38a and fθ lens 38b) having optical power, there is a risk that the optical path is changed, which deteriorates the performance of the optical beam scanning apparatus 11 or the like.

Figure 20:
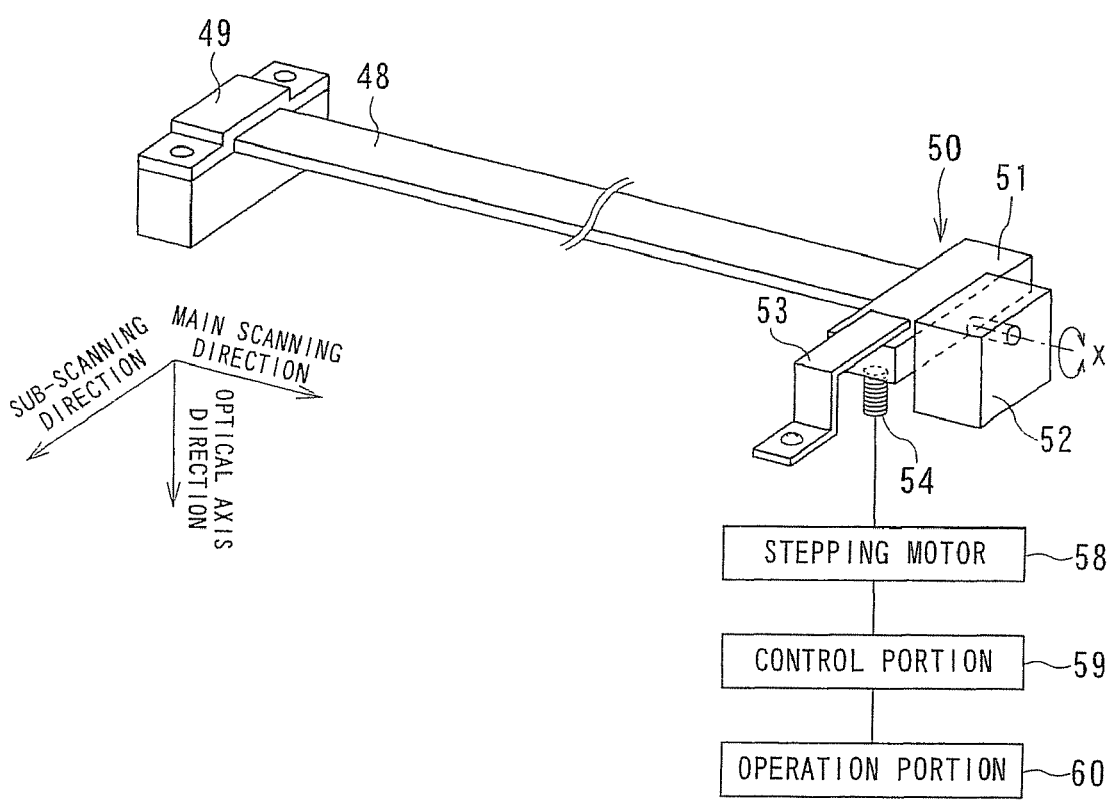
FIG. 20 is a view showing the configuration when a twist angle adjusting mechanism used to correct the curve and the inclination of the scanning line is driven on motor.

The correction of the curve and the inclination of the scanning line using the parallel plate 48 of the present invention can be performed at the unit stage before the image forming apparatus 1 is shipped as the product. However, as is shown in FIG. 20, a stepping motor 58 (direct operating motor) may be connected to the set screw 54 of the twist angle adjusting mechanism 50 to drive the twist angle adjusting mechanism 50 on motor by controlling the stepping motor 58 by a control portion 59 according to an operation input through an operation portion 60, so that the correction is performed on regular basis according to an image pattern being formed.

What is claimed is:

1. An optical beam scanning apparatus comprising:
    an optical housing;
    a light source provided in the optical housing;
    a polygon mirror configured to reflect a light emitted from the light source;
    a parallel plate configured to transmit the light reflected by the polygon mirror;
    a fixing mechanism configured to fix part of the parallel plate provided within the optical housing; and
    a twist angle adjusting mechanism configured to adjust an angle of twist of the parallel plate having the part thereof being fixed with the fixing mechanism.

2. The optical beam scanning apparatus according to claim 1, wherein:
    the parallel plate causes a beam emitted from a light source provided within the optical housing to pass through a photoconductor corresponding to the light source, the photoconductor being provided within the optical housing.

3. The optical beam scanning apparatus according to claim 2, wherein:
    a light deflecting device is further provided within the optical housing, the light deflecting device scanning the beam emitted from the light source against the photoconductor corresponding to the light source in a main scanning direction, and the parallel plate is provided on a downstream side of the light deflecting device in an optical path of the beam emitted from the light source.

4. The optical beam scanning apparatus according to claim 1, wherein:
    the fixing mechanism fixes a substantially center portion of the parallel plate.

5. The optical beam scanning apparatus according to claim 4, wherein:
    the twist angle adjusting mechanism adjusts an angle of twist of the parallel plate by rotating both sides of the parallel plate in the specific direction.

6. The optical beam scanning apparatus according to claim 4, wherein:
    a driving mechanism configured to drive the twist angle adjusting mechanism on motor.

7. The optical beam scanning apparatus according to claim 4, wherein:
    the twist angle adjusting mechanism adjusts an angle of twist of the parallel plate by rotating both sides of the parallel plate in the specific direction.

8. The optical beam scanning apparatus according to claim 1, wherein:
    the fixing mechanism fixes both sides of the parallel plate.

9. The optical beam scanning apparatus according to claim 8, wherein:
    the twist angle adjusting mechanism adjusts an angle of twist of the parallel plate by rotating a substantially center portion of the parallel plate in the specific direction.

10. The optical beam scanning apparatus according to claim 1, wherein:
    the twist angle adjusting mechanism comprises a movable member to hold the parallel plate, a leaf spring to apply a pressure on the movable member from an upper portion, and a screw to push up the movable member from a lower portion.

11. The optical beam scanning apparatus according to claim 1, wherein:
    the parallel plate is made of a glass material.

12. An image processing apparatus comprising:
    a photoconductor;
    an optical housing having a light source and plural optical members that irradiate scanning line by a beam emitted from the light source onto the photoconductor;
    a polygon mirror configured to reflect a light emitted from the light source;
    a parallel plate configured to transmit the light reflected by the polygon mirror;
    a fixing mechanism configured to fix part of the parallel plate provided within the optical housing; and
    a twist angle adjusting mechanism configured to adjust an angle of twist of the parallel plate having the part thereof being fixed with the fixing mechanism.

13. The image processing apparatus according to claim 12, wherein:
    the parallel plate causes a beam emitted from a light source provided within the optical housing to pass through a photoconductor corresponding to the light source.

14. The image processing apparatus according to claim 12, wherein:
    the plural optical members include a light deflecting device, the light deflecting device scanning the beam emitted from the light source against the photoconductor corresponding to the light source in a main scanning direction, and the parallel plate is provided on a downstream side of the light deflecting device in an optical path of the beam emitted from the light source.

15. The image processing apparatus according to claim 12, wherein:
    the fixing mechanism fixes a substantially center portion of the parallel plate.

16. The image processing apparatus according to claim 15, wherein:
    the twist angle adjusting mechanism adjusts an angle of twist of the parallel plate by rotating one side of the parallel plate in the specific direction.

17. The image processing apparatus according to claim 12, wherein:
    the fixing mechanism fixes both sides of the parallel plate.

18. The image processing apparatus according to claim 17, wherein:
    the twist angle adjusting mechanism adjusts an angle of twist of the parallel plate by rotating a substantially center portion of the parallel plate in the specific direction.

* * * * *